June 9, 1964
J. B. EVANS ETAL
3,136,223
FLUID MOTOR
Filed Jan. 9, 1962
4 Sheets-Sheet 1
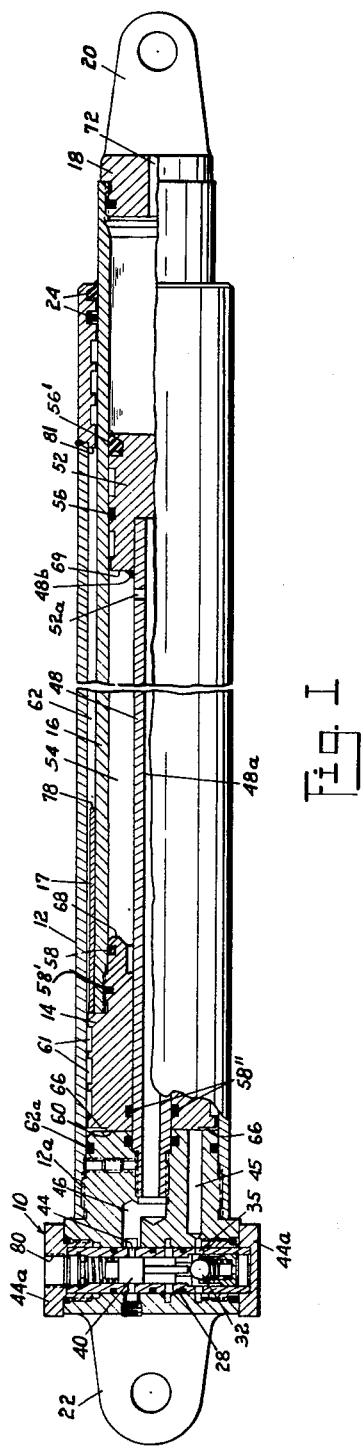
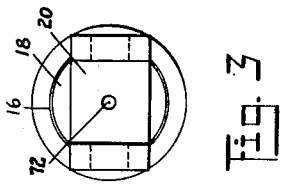
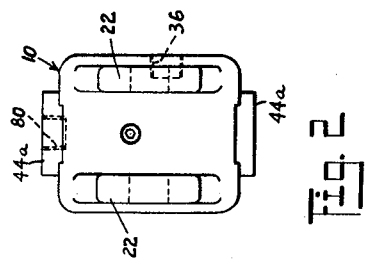
INVENTORS
JOHN BARRY EVANS AND
WILLIAM A. WICKLINE
BY
Teare, Fetzer & Teare
ATTORNEYS June 9, 1964   J. B. EVANS ETAL   3,136,223
FLUID MOTOR Filed Jan. 9, 1962                           4 Sheets-Sheet 2

INVENTORS
JOHN BARRY EVANS AND
WILLIAM A. WICKLINE
BY
Teare, Fetzer & Teare
ATTORNEYS June 9, 1964  J. B. EVANS ETAL  3,136,223
FLUID MOTOR Filed Jan. 9, 1962  4 Sheets-Sheet 3

INVENTORS
JOHN BARRY EVANS AND
WILLIAM R. WICKLINE
BY
Jearl, Felzen & Jearl
ATTORNEYS United States Patent Office 3,136,223
Patented June 9, 1964

3,136,223
FLUID MOTOR
John Barry Evans, Willoughby, and William A. Wickline, Willowick, Ohio, assignors, by mesne assignments, to The Ohio Brass Company, Mansfield, Ohio, a corporation of New Jersey
Filed Jan. 9, 1962, Ser. No. 165,102
10 Claims. (Cl. 91—206)

This invention relates in general to reciprocal type, fluid powered motor units, and more particularly to a fluid powered motor unit which may be advantageously used in a size requiring a considerable length of stroke.

Reciprocal type, fluid powered motor units are utilized in many environmental situations for actuating machine components. An example of extensive use of such motor units in a particular environment, is in mobile, collapsible type derricks or cranes, which may be actuated in their movements, and particularly in their vertical plane movements, by reciprocal fluid powered motor units. An example of such use is illustrated in United States Patent No. 2,980,263 issued April 18, 1961, to Herman J. Troche et al.

In situations where the length or stroke of the motor unit is considerable, it is usually necessary to increase the size or diameters of the piston and cylinder components of the motor unit, so as to minimize or eliminate bending of the unit when extended. Such relatively large sizes or diameters of piston and cylinder elements may result in forces or actuating power from the unit greatly in excess of that required to do the work, when pressurized fluid is applied to the motor unit, it being understood that such a motor unit generally has to be used compatibly in a pressurized fluid system having other components or elements requiring highly pressurized fluid, in order to perform the functions for which they are utilized.

The present invention provides a novel reciprocal type motor unit which may be of a relatively large size, both in the diameters of the piston and cylinder elements of the motor unit, and in the length of the motor unit, but which will provide a relatively small actuating or lifting force upon application of pressurized fluid to the motor unit. The motor unit of the invention is especially well adapted for use in elevating derricks and cranes, and wherein the length of stroke required for the motor unit is relatively large.

Accordingly, an object of the invention is to provide an improved arrangement of reciprocal type, fluid powered motor unit.

Another object of the invention is to provide a motor unit of the above type which may be advantageously utilized in situations where a relatively long stroke of motor unit is required, but which will have a relatively lesser actuating power or force as conventionally compared to the size of the piston and cylinder components utilized therein.

A more specific object of the invention is to provide a reciprocable type, fluid powered motor unit which may be of a relatively large size both in diameters of the piston and cylinder elements of the motor unit, and in the length of the motor unit, and wherein such unit comprises telescopically arranged outer and inner members with the inner member representing the piston rod of the unit and having a piston head at one end thereof and with the outer member representing the exterior housing or cylinder of the unit, and with such piston head being mounted for reciprocal movement on an axially extending guide element, together with valve and fluid passageway means providing for transmittal of pressurized fluid to opposite sides of the piston head, and including means for decreasing the effective pressure area of such piston head, so as to decrease the actuating power or lifting force of the motor as compared to that conventionally provided by a corresponding size of piston head.

Another object of the invention is to provide a reciprocal fluid powered motor unit of single ended construction in which the retracting and extending speeds may be arranged in any desired ratio with respect to one another, when the motor unit is provided with a constant volume source of pressurized fluid.

Other objects and advantages of the invention will be apparent from the following description taken in conjunction with the accompanying drawings wherein:

FIG. 1 is a broken, partially sectioned, side elevational view of a reciprocal type motor unit constructed in accordance with the instant invention;

FIG. 2 is an end elevational view taken generally from the left hand end of FIG. 1;

FIG. 3 is an end elevational view taken generally from the right hand end of FIG. 1;

Figure 9:
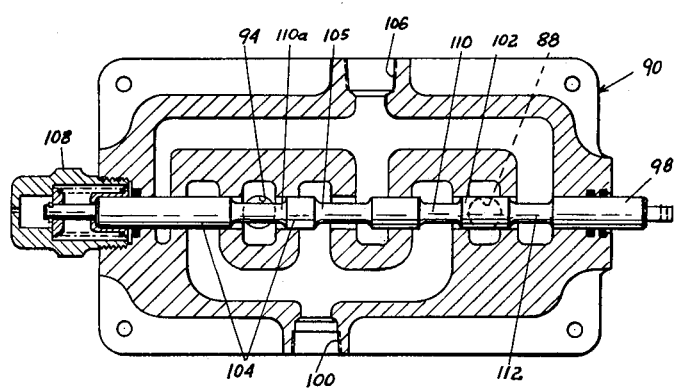
FIG. 9 is a sectional view of the control valve of FIG. 8 with the valve spool in neutral position to block the distributing ports of the valve from communication with the inlet port thereof.
Figure 10:
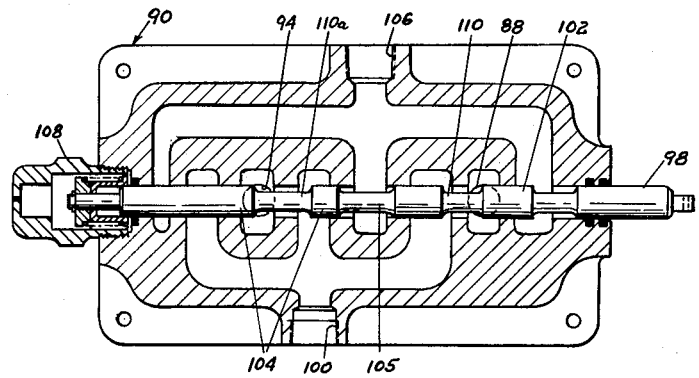
Figure 11:
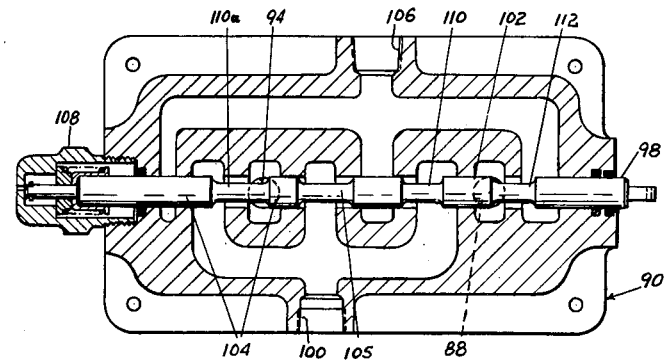

FIG. 10 is a sectional view of the control valve generally similar to FIG. 9, but illustrating the valve spool moved to a position whereby both distributing ports of the valve are pressurized, and FIG. 11 is a sectional view of the control valve of FIGS. 9 and 10, but wherein the valve spool has been moved to a position wherein one of the distributing ports is pressurized and the other distributing port is coupled to the outlet port of the valve.

Figure 5:
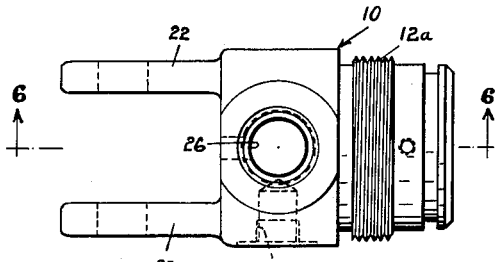
FIG. 5 is a top plan view of the front end plug of the motor unit, which mounts the FIG. 4 valve mechanism therein.
Figure 7:
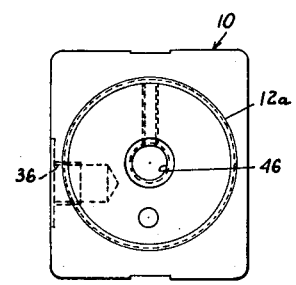
FIG. 7 is an end elevational view of the plug member of FIG. 5, taken generally from the right hand end thereof.
Figure 6:
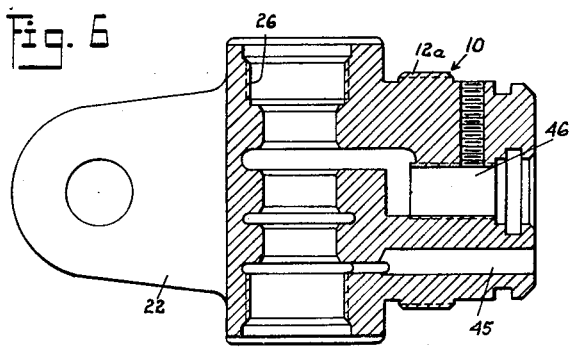
FIG. 6 is a sectional view taken generally along the plane of line 6—6 of FIG. 5, looking in the direction of the arrows.
Figure 8:
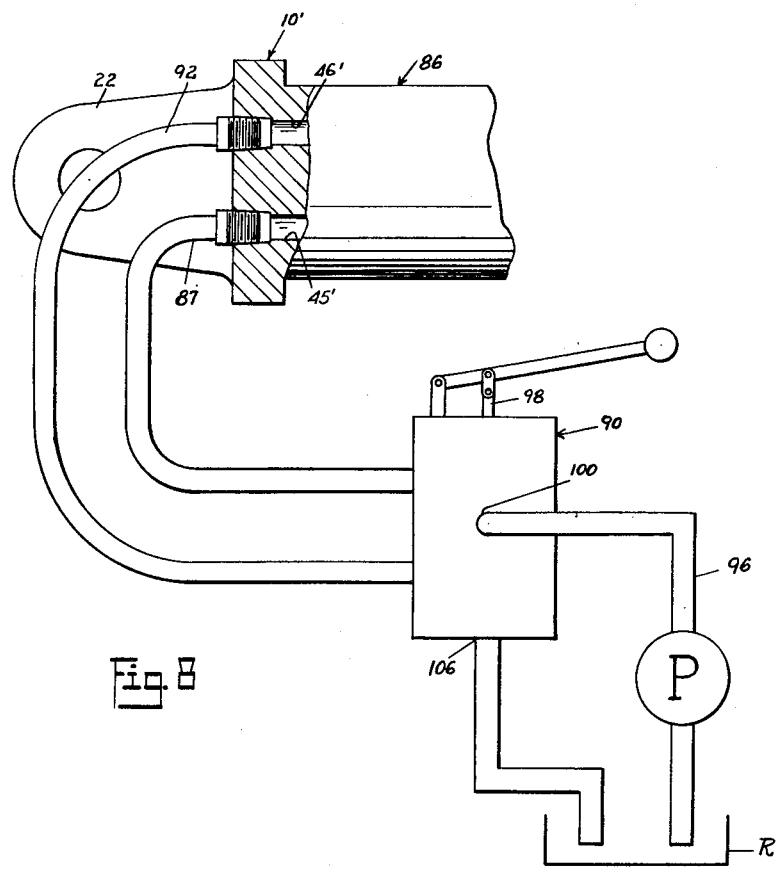
FIG. 8 is a fragmentary, partially sectioned, generally diagrammatic showing of another embodiment of the invention, and more particularly a reciprocal motor unit utilizing a completely external control valve for controlling the application of pressurized fluid to the motor unit.

Referring now again to the drawings, the reciprocal type motor unit may comprise the front end plug member 10 (FIGS. 1 and 5) to which is secured the preferably cylindrical outer member 12, forming the exterior housing or cylinder for the motor unit. The cylinder 12 may be detachably secured to the front end plug as by means of threads 12a. Disposed interiorly of the outer member 12 is piston head element 14, to which may be threadedly secured an inner, cylindrical (in the embodiment illustrated) member 16, which represents the piston rod for the motor unit. Sleeve member 17 may extend rearwardly from piston head 14 in encompassing relation to the underlying rod 16. The exterior or rearward end of member 16 may be closed by a rear plug member 18, preferably threadedly attached, to which may be secured apertured ears or a bracket 20, for pivotally attaching the motor unit to mechanism or a machine structure, such as for instance a derrick, with which the motor unit may be used. The front plug member 10 likewise may have apertured ears 22 attached thereto, for pivotally securing such corresponding end of the motor unit to a machine structure with which the motor unit is used. Sealing elements 24 coacting between the inner and outer members 12 and 16 adjacent the rear ends thereof, provide for a fluid seal between such members.

Figure 4:
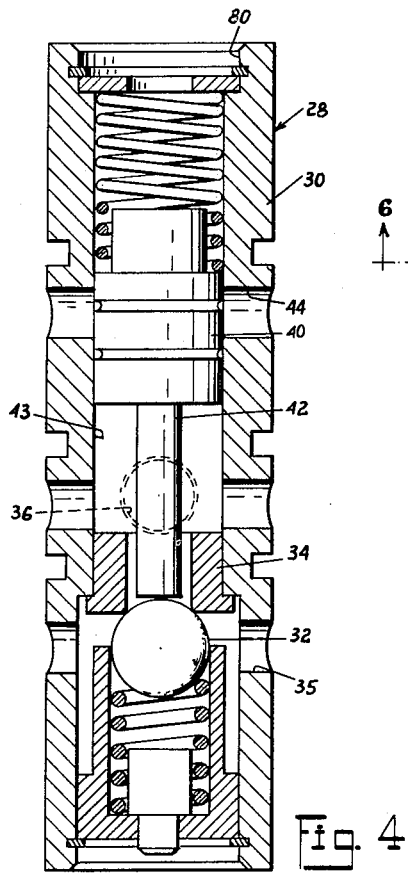
FIG. 4 is an enlarged, sectional view illustrating the check valve mechanism utilized in the motor unit, for directing the flow of fluid pressure therein.

Front end plug 10 comprises a crosswise extending passageway 26 therethrough in which is disposed check valve mechanism 28 (FIG. 4). Check valve mechanism 28 comprises a sleeve or housing member 30 in which is disposed a spring loaded, ball check valve 32, which is adapted for coaction with valve seat 34, for resiliently closing off passageway 35 through the wall of housing 30, from fluid pressure entering port 36 in the front plug member 10. Spring loaded plunger 40 having an elongated stem 42, is also disposed in the passageway 43 extending through the sleeve 30 of the check valve assembly, and with such plunger normally closing passageway or port 44 through the wall of the sleeve 30. The check valve assembly 28 is preferably removably held in the front end plug 10 by threaded end cap members 44a.

Passageway 45 communicating with a forementioned passageway or port 35 in the valve housing 30 is provided in the front end plug, and passageway 46 communicating with passageway or port 44 in the housing is also provided in the plug member.

Preferably removably attached, as by means of threads, to the front end plug member 10 and communicating with aforementioned passageway 46, is an elongated, axially apertured as at 48a, sleeve or stem member 48. Secured to the end of stem member 48, and as by means of welds 48b, is a cylindrical (in the embodiment illustrated) base member 52, held stationary with respect to the front end plug 10 by the stem 48. The piston head 14 and associated piston rod 16 are movable axially with respect to the stem member 48 and associated base member 52 and are guided in their axial movement with respect to the outer housing or cylindrical member 12 by such stem and base members.

At least one radially extending port or passageway 52a is provided through the defining wall of stem member 48, which communicates the axial passageway 48a of the stem member with the chamber 54 defined between the stem member 48 and the encompassing inner piston rod member 16. Sealing elements 56, 56′ and 58, 58′, 58″, on respectively the base member 52 and the piston head member 14, are provided to prevent the escape of fluid axially of the stem member, and between the circumferential surfaces of the base member 52 and the piston head 14.

The aforementioned passageway 45 in the front end plug 10 provides for pressurized fluid communication with the front pressure acting surface 60 of the piston head 14, thereby providing for application of pressurized fluid to such piston head. The piston head 14 is preferably circumferentially grooved, as at 61, and so arranged in the outer cylindrical member 12, so that fluid pressure can pass axially between the piston head and the confronting wall of the outer cylindrical member 12, and into chamber 62 between the inner cylindrical member 16 and the outer cylindrical member 12. Aforementioned sealing elements 24 and sealing elements 62a prevent seepage of pressurized fluid axially out of chamber 62.

It will be noted that the combined effective pressure areas of the chambers 54 and 62 are less than the effective front pressure area 60 of the piston head by the amount of the front end or circumferential area of the inner cylindrical member 16.

Operation of the novel reciprocal motor unit is preferably as follows: A directional control valve (not shown) is utilized to direct pressurized fluid into aforementioned port 36 in the front end plug 10, and such pressurized fluid forces check valve ball 32 off of its valve seat 34, thus permitting fluid flow through port 35 and passageway 45 into actuating engagement with the front end surface 60 of the piston head 14. Such front end surface 60 is preferably provided with channels 66 therein through which pressurized fluid flows radially outwardly whereupon it passes between the exterior of the piston head 14 and the inner defining surface of outer cylindrical member 12, and into chamber 62. Pressurized fluid from port 36 also forces the plunger 40 outwardly against the resistance of its associated spring, thereby opening aforementioned port 44 and allowing fluid pressure to pass through passageway 46 into the passageway 48a in stem member 48, such fluid pressure thus passing through port 52a into chamber 54. Fluid pressure in chamber 54 acts equally against the piston head as at 68, and against the base member 52 as at 69, and likewise the fluid pressure in chamber 62 acts equally against the ends of such chamber in like manner. A vent 72 in rear end plug 18 allows atmospheric air to the inside of the inner cylindrical member, and thus the outer end area of such member is subjected to only the atmosphere. The difference in the effective pressure areas on the front and rear ends of the piston head, forces the piston head 14 and associated piston rod or inner cylindrical member 16, to move outwardly of the outer cylindrical member 12. During such outward movement, the fluid in chambers 62 and 54 is forced into the space between the rearward end of the front end plug 10 and the front surface 60 of the piston head member 14, which space increases as the piston head and associated piston rod move outwardly. When the aforementioned distributing or control valve in the system is closed to stop fluid flow through port 36, the outward movement of the piston will stop, and check valve ball 32 and plunger 40 will return to their original positions, due to the biasing of their associated spring means, thereby locking the fluid in the cylinder, and causing it to maintain a static position in either axial direction.

The relatively small effective pressure area of the piston head, represented by the area of the forward end of the inner cylindrical member 16, allows a large diameter piston and cylinder to be used under high fluid pressure, and still obtain a relatively small lifting or actuating force out of the motor unit, with such relatively large piston and associated piston rod effectively providing for considerable bending resistance in the motor unit.

The piston rod 16 and associated piston head 14 are retracted when pressurized fluid is admitted into port 80 (FIG. 1) in the front end plug 10, thus causing the plunger 40 to move inwardly toward the ball check 32 and thereby opening port 44 in the check valve housing wall. The stem portion 42 on the plunger 40 engages the ball check 32, and moves the ball off the check valve seat 34. Pressurized fluid now flows through port 44, through passageway 46, and through the passageway 48a of stem member 48, and thence up through port 52a into chamber 54. Chamber 54, of course, has been decreased in size by the outward movement of the piston head and associated piston rod 16 on their outward stroke. The pressurized fluid acting against the piston head at 68 then forces the piston head and associated rod 16 inwardly with respect to outer housing or cylinder 12. The fluid in the space between the forward surface of the piston head and the rearward end of the front end plug 10 is forced into the chamber 62 which is increasing due to the same reason as the increasing size of the chamber 54, and the remaining fluid is forced outwardly through passage 45 in the front end plug, through the open ball check valve 32 and through port 36 to the directional control valve and the associated reservoir of the fluid system.

In a cylinder of this type, the effective lifting area, such as that represented by the end area of the inner cylindrical member or piston rod 16 and the effective retraction area, such as the effective area 68 of the inner surface of the piston head 14 may be made equal in size, and thereby obtain a cylinder in which the push and pull strokes are equal in force and speed. It will be noted that the maximum outward stroke of the motor unit is controlled by the longitudinal distance between the inner surface 78 on aforementioned sleeve 17 secured to the piston rod 16 and the abutment surface 81 adjacent the rearward end of the outer cylinder 12, which distance is preferably just slightly smaller than the longitudinal distance between inner surface 68 on the piston head 14 and the front surface 69 on base member 52.

Due to the ready detachability of the component parts of the motor unit, it may be readily disassembled for maintenance and repair thereof.

Referring now to FIGS. 8–11, there is illustrated another embodiment, and one wherein a completely external control valve is utilized to control the flow of pressurized fluid from the constant volume source to the motor unit. The motor unit 86 may be generally similar to that of the first described embodiment except that the front end plug 10' does not embody any valve mechanism corresponding to valve mechanism 28 of the first described embodiment. Passageway 46' in the front plug 10' communicates with inner side of the motor unit's piston head, and passageway 45' communicates with the other side of the piston head, in the same organizational arrangement as that of the first embodiment. Passageway 45' may be coupled, as by means of fluid distributing line 87 to fluid distributing port 88 of control valve 90, while passageway 46' may be coupled, as by means of fluid distributing line 92, to fluid distributing port 94 of valve 90. Valve 90 may be remotely located with respect to the motor unit and lines 87 and 92 may be of the conventional flexible type.

Valve 90 may be connected as via line 96, to the constant volume source of pressurized fluid, represented by pump P, and valve 90 may include pressure relief means for returning the fluid from the valve 90 back to the reservoir R, when the valve spool 98 of the valve is in neutral position, as for instance is shown in FIG. 9. In this position, the pressurized fluid entering entry port 100 in the valve is blocked by the collar portions 102 and 104 of the spool from communicating with distributing ports 88, 94 in the valve. However, as may be seen from FIG. 9, the inlet port 100 of the valve is communicating via annular groove 105 of the spool with the outlet or reservoir port 106 of the valve, thereby returning the pressurized fluid to the reservoir.

When the valve spool is moved against the resistance of the associated spring mechanism 108 to the position illustrated in FIG. 10, distributing ports 88 and 94 are pressurized from inlet port 100 and via annular grooves 110 and 110a in the spool, to thereby admit fluid pressure to passageways 45' and 46' in the motor unit and cause actuation of the latter in the same way as aforedescribed in connection with the first embodiment.

When the valve spool 98 is moved to the position illustrated in FIG. 11, distributing port 94 is pressurized via annular groove 110a in the spool, while distributing port 88 is communicated via annular groove 112 with outlet port 106, thereby causing retraction of the motor unit in a similar manner as aforedescribed in connection with the first embodiment.

From the foregoing discussion and accompanying drawings it will be seen that the invention provides a novel reciprocal type motor unit, which can be made in a relatively large size to effectively resist bending stresses in the motor unit, but wherein the actuating force of the motor unit may be made relatively small.

It will also be seen that the invention provides a fluid powered reciprocal type motor unit wherein the retracting and extending speeds of the motor unit may be selectively arranged in a predetermined ratio with respect to one another irrespective of actuation of the motor unit from a constant volume source of pressurized fluid.

The terms and expressions which have been used are used as terms of description and not of limitation, and there is no intention in the use of such terms and expressions of excluding any equivalents of any of the features shown or described, or portions thereof, but it is recognized that various modifications are possible within the scope of the invention claimed.

We claim:

1. In a reciprocal type fluid powered motor unit comprising an outer member, a front end plug closing the corresponding end of said member, said plug including an exteriorly accessible pressurized fluid distributing port, valve means mounted in said plug, said valve means comprising plural check valve mechanisms, a piston head disposed in said outer member rearwardly of said plug, a hollow piston rod attached to said head, said piston rod being spaced radially inwardly from said outer member to define a pressurized fluid receiving chamber therebetween, and axially apertured stem attached to said plug and extending rearwardly thereof interiorly of said rod and through said head, said head and rod being adapted for relative axial movement with respect to said outer member and said stem, a base member secured to said stem in rearward axially spaced relation with respect to said head, sealing means coacting between said base member and the interior of said rod and between said head and said stem to provide a leakage proof pressurized fluid chamber between said stem and said rod and intermediate said head and said base member, passageway means providing for fluid communication between said chamber and the interior of said stem, second passageway means in said plug communicating with said axial aperture in said stem, one of said check valve mechanisms normally closing said second passageway means from communication with said port in said plug, a third passageway means in said plug communicating with the forward end of said head, and another of said check valve mechanisms normally closing said third passageway means from communication with said port in said plug, said check valve mechanisms being deactivated upon application of pressurized fluid to said port whereby pressurized fluid is simultaneously applied to both the forward and rearward ends of said head via said passageway means for reducing the actuating force of said motor unit during extension of the latter, and means providing for axial flow of pressurized fluid between said outer member and said head and into and out of the first mentioned chamber during actuation of said motor unit.

2. In a reciprocal type fluid powered motor unit comprising an outer member, a front end plug closing the corresponding end of said member, said plug including an exteriorly accessible pressurized fluid distributing port, valve means mounted in said plug, said valve means comprising plural check valve mechanisms, a piston head disposed in said outer member rearwardly of said plug, a hollow piston rod attached to said head, said piston rod being spaced radially inwardly from said outer member to define an actuating fluid receiving chamber therebetween, sealing means coacting between said plug and said outer member and between said outer member and said rod to close the ends of the last mentioned chamber against fluid leakage, an axially apertured stem attached to said plug and extending rearwardly thereof interiorly of said rod and through said head, said head and rod being adapted for relative axial movement with respect to said outer member and said stem, a base member secured to said stem in rearward axially spaced relation with respect to said head, sealing means coacting between said base member and the interior of said rod, and between said head and said stem to provide another leakage-proof pressurized fluid chamber between said stem and said rod and intermediate said head and said base member, passageway means providing for fluid communication between said other chamber and the interior of said stem, second passageway means in said plug communicating with said axial aperture in said stem, one of said check valve mechanisms normally closing said second passageway means from communication with said port in said plug, a third passageway means in said plug communicating with the forward end of said head, and another of said check valve mechanisms normally closing said third passageway means from communication with said port in said plug, said check valve mechanisms being deactivated upon application of pressurized fluid to said port, whereby pressurized fluid is simultaneously applied to both the forward and rearward ends of said head via said passageway means for reducing the actuating force of said motor unit during extension of the latter, said head including means thereon providing for generally axial flow of pressurized fluid between said outer member and said head and into the first mentioned chamber upon application of fluid pressure to said port.

3. A motor unit in accordance with claim 2 wherein said plug includes a second exteriorly accessible pressurized fluid distributing port communicating with said one valve mechanism, said one valve mechanism including means for moving said other valve mechanism from said normal position, upon application of pressurized fluid to said second port, and said one valve mechanism being adapted to be deactivated to permit passage of fluid pressure into said second passageway means upon application of fluid pressure to said second port, whereby fluid pressure is applied to said rearward end of said head to retract said motor unit.

4. In a reciprocal type, double acting fluid powered motor unit comprising an outer cylinder, a front end plug closing the corresponding end of said cylinder, said plug including a pair of exteriorly accessible pressurized fluid distributing ports, valve means mounted in said plug, said valve means including a plurality of spring biased check valves, a piston head disposed in said cylinder rearwardly of said plug, a hollow cylindrical piston rod attached to said head, the exterior of said rod being spaced radially inwardly from the interior of said cylinder and from the outer boundary of said head, said head having an axial opening therethrough, an axially apertured stem attached to said plug and extending rearwardly therefrom interiorly of said rod and through said opening in said head, said stem being spaced radially inwardly from the interior of said rod, said head and rod being adapted for relative axial movement with respect to said cylinder and said stem, the rearward end of said stem being closed, a base member secured to said stem in rearward axially spaced relation with respect to said head, means sealing the ends of the space between said stem and said rod to provide a first pressurized fluid chamber between said head and said base member, means providing fluid passing communication between said first chamber and the interior of said stem, said head being so spaced from the interior of said cylinder as to provide for axial flow of pressurized fluid between said head and said cylinder during actuation of said motor unit, and into and from the space between said rod and said cylinder, means adjacent the rearward end of said cylinder providing for sealing coaction between said rod and said cylinder to provide a second chamber intermediate said rod and said cylinder, means in said plug providing for communication between one of said check valves and the axial aperture in said stem, other means in said plug providing for communication between the other check valve and the forward end of said head, said check valves normally closing off the respective communicating means, said check valves being movable outwardly away from one another responsive to application thereto of pressurized fluid from one of said ports to thereby deactivate said valves and permit simultaneous application of pressurized fluid to the forward end of said head and to said chambers thereby reducing the actuating force of said motor unit during extension thereof, said one of said check valves having means thereon adapted for actuation of said other check valve upon application of fluid pressure to said one check valve from the other of said ports, whereby fluid pressure is applied to said first chamber via said one check valve and fluid is drained from said cylinder forwardly of said head via said other check valve during retraction of said motor unit.

5. In combination, a reciprocal type fluid powered motor unit and a control valve for said unit, said unit comprising a piston head, a piston rod secured to said piston head, a housing member encompassing said head, said head and housing member being adapted for relative axial movement, said rod being spaced radially inwardly from said housing member to define an actuating fluid receiving chamber therebetween, fluid transmitting means in said housing commencing adjacent one end thereof and communicating with opposite ends of said piston head for reducing the actuating force of said motor unit, said means including means on said head providing for axial flow of pressurized fluid between said housing member and said head and into said chamber said valve being coupled to said means for transmittal of pressurized fluid thereto, said valve including an axially movable spool for controlling the flow of pressurized fluid to said motor unit, orientation of said spool in one position causing application of pressurized fluid to opposite ends of said piston head, orientation of said spool in another position causing application of fluid pressure to only one end of said piston head and drainage of fluid from the other end of said piston head.

6. In a reciprocal type fluid powered motor unit comprising, a housing, a piston head disposed in said housing, a hollow piston rod secured to said head and projecting axially out of one end of said housing, said piston rod being spaced radially inwardly from said housing and defining a first actuating fluid receiving chamber therebetween sealing means coacting between said one end and said rod to seal the corresponding end of said chamber against egress of fluid, said head and rod being adapted for relative axial movement with respect to said housing, actuating fluid transmitting means for simultaneously applying pressurized actuating fluid to opposite ends of said piston head for the full stroke of said rod for reducing the actuating force of said motor unit, said transmitting means including a hollow, radially apertured stem secured to said housing and a member secured to said stem and spaced axially from said head interiorly of said rod to define a second actuating fluid receiving chamber, and including means providing for generally axial flow of actuating fluid along said head and into said first chamber, egress of fluid from said first chamber being possible only by way of the last mentioned means, and valve means for controlling the application of pressurized fluid to said transmitting means.

7. A reciprocal-type of fluid powered motor unit comprising a piston head, a piston rod secured to said piston head, said piston rod being hollow, a housing member encompassing said head and adapted for relative axial movement with respect to said head and rod, said rod being spaced radially inwardly from said housing member to define a fluid receiving chamber therebetween, fluid transmitting means for simultaneously applying fluid pressure to opposite ends of said piston head for reducing the actuating force of said motor unit, said fluid transmitting means including an axially apertured stem extending axially and interiorly of said rod and passing through said head, means securing said stem to said housing member, said head and rod being adapted for relative axial movement with respect to said stem, a base member secured to said stem in axially spaced relation to said head, sealing means coacting between said base member and said rod and between said head and said stem to provide a pressurized fluid chamber between said stem and said rod, means providing fluid passing communication between the last mentioned chamber and the interior of said stem, means providing for generally axial flow of pressurized fluid between said housing member and said head and into the first mentioned chamber, and valve means for controlling the application of fluid pressure to said transmitting means.

8. In a reciprocal type fluid powered motor unit comprising an outer member, a front end plug closing the corresponding end of said member, said plug including an exteriorly accessible pressurized fluid distributing port, valve means mounted in said plug, said valve means comprising plural check valve mechanisms, a piston head disposed in said outer member rearwardly of said plug, a hollow piston rod attached to said head, an axially apertured stem attached to said plug and extending rearwardly thereof interiorly of said rod and through said head, said head and rod being adapted for relative axial movement with respect to said outer member and said stem, a base member secured to said stem in rearward axially spaced relation with respect to said head, sealing means coacting between said base member and the interior of said rod and between said head and said stem to provide a leakage-proof pressurized fluid chamber between said stem and said rod and intermediate said head and said base member, passageway means providing for fluid communication between said chamber and the interior of said stem, second passageway means in said plug communicating with said axial aperture in said stem, one of said check valve mechanisms normally closing said second passageway means from communication with said port in said plug, a third passageway means in said plug communicating with the forward end of said head, and another of said check valve mechanisms normally closing said third passageway means from communication with said port in said plug, said check valve mechanisms being deactivated upon application of pressurized fluid to said port whereby pressurized fluid is simultaneously applied to both the forward and rearward ends of said head via said passageway means for reducing the actuating force of said motor unit during extension of the latter, said one valve mechanism comprising a spring loaded plunger movable in a passageway in said plug, said other valve mechanisms comprising a spring loaded ball normally engaging a valve seat, said port communicating with said valve mechanisms intermediate said ball and said plunger, said ball and plunger being disposed in axial alignment and being adapted for outward movement with respect to one another upon application of pressurized fluid to said port.

9. A motor unit in accordance with claim 8 wherein the area of the rearward end of said head which is exposed in said chamber is the same as the cross sectional area of said rod.

10. A reciprocal type fluid powered motor unit comprising a housing, a piston head disposed in said housing, a hollow piston rod secured to said piston head and extending axially from one end of said housing, said rod being spaced radially inwardly from said housing and defining a first actuating fluid receiving chamber therebetween, means coacting between said one end of said housing and said rod and sealing the corresponding end of said chamber against egress of pressurized fluid, said head and attached rod and said housing being adapted for relative axial movement, and means for substantially simultaneously applying fluid pressure to opposite ends of said piston head for the full stroke of said rod for reducing the actuating force of said motor unit, said fluid pressure applying means including means secured to said housing and spaced axially from said piston head interiorly of said rod, and defining in conjunction with said rod and said piston head a second actuating fluid receiving chamber, and providing for the flow of actuating fluid into said second chamber, and means providing for generally axial flow of actuating fluid along said piston head and into said first chamber, egress of fluid from said first chamber being possible only by way of the last mentioned means.

References Cited in the file of this patent

UNITED STATES PATENTS

| | | |
|---|---|---|
| 1,294,266 | Hogg | Feb. 11, 1919 |
| 2,345,919 | Davis | Apr. 4, 1944 |
| 2,490,778 | Burritt | Dec. 13, 1949 |
| 2,623,501 | Audemar | Dec. 30, 1952 |
| 2,661,721 | Sherwen | Dec. 8, 1953 |
| 2,916,049 | Ruhl | Dec. 8, 1959 |
| 2,932,281 | Moskowitz | Apr. 12, 1960 |
| 2,970,576 | Hirvonen | Feb. 7, 1961 |

FOREIGN PATENTS

| | | |
|---|---|---|
| 631,332 | Great Britain | Nov. 1, 1949 |
| 1,236,902 | France | June 13, 1960 |